(12) United States Patent
Yokoyama et al.

(10) Patent No.: US 11,247,467 B2
(45) Date of Patent: Feb. 15, 2022

(54) CHEMICAL LIQUID DISPENSING APPARATUS

(71) Applicant: TOSHIBA TEC KABUSHIKI KAISHA, Tokyo (JP)

(72) Inventors: Shuhei Yokoyama, Mishima Shizuoka (JP); Ryutaro Kusunoki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/927,793

(22) Filed: Jul. 13, 2020

(65) Prior Publication Data

US 2021/0086511 A1 Mar. 25, 2021

(30) Foreign Application Priority Data

Sep. 24, 2019 (JP) .............................. JP2019-172694

(51) Int. Cl.
*B41J 2/14* (2006.01)
*G01N 35/10* (2006.01)

(52) U.S. Cl.
CPC ....... *B41J 2/14233* (2013.01); *B41J 2/14282* (2013.01); *B41J 2/14298* (2013.01);
(Continued)

(58) Field of Classification Search
CPC .......................... B41J 2/14233; B41J 2/14282; B41J 2/14298; B41J 2002/1437; B41J 2002/14475; B41J 2202/11; B41J 2202/15; B41J 2/2128; B41J 2/2142; G01N 2035/1034; G01N 35/00693; G01N 35/1065; G01N 35/1016; B05B 15/50; B05B 12/084
See application file for complete search history.

(56) References Cited

U.S. PATENT DOCUMENTS 7,823,535 B2 11/2010 Hanafusa et al.
10,059,100 B2 8/2018 Yokoyama et al.
(Continued)

FOREIGN PATENT DOCUMENTS

EP 1548448 A1 6/2005
WO 2016065369 A1 4/2016
WO 2018204791 A1 11/2018

OTHER PUBLICATIONS

Extended European Search Report dated Feb. 11, 2021, mailed in counterpart European Application No. 20192054.3, 9 pages.

*Primary Examiner* — Lamson D Nguyen
(74) *Attorney, Agent, or Firm* — Kim & Stewart LLP

(57) ABSTRACT

According to one embodiment, a liquid dispensing apparatus includes a mounting unit configured to hold a liquid discharging apparatus that discharges liquid from nozzles simultaneously by an operation of an actuator. An inspection media placement region is provided on which an inspection medium can be placed to receive the liquid discharged from the liquid discharging apparatus. A controller is configured to control the actuator to vary a volume of the liquid discharged from each nozzle for a nozzle inspection operation. The volume is varied according to a predetermined distance between adjacent nozzles that simultaneously discharge liquid and a predetermined contact angle for a droplet of the liquid when on the inspection medium.

20 Claims, 12 Drawing Sheets

(52) U.S. Cl.
CPC ............ *B41J 2002/1437* (2013.01); *B41J 2002/14475* (2013.01); *B41J 2202/11* (2013.01); *B41J 2202/15* (2013.01); *G01N 2035/1034* (2013.01)

(56) References Cited

U.S. PATENT DOCUMENTS

| | | |
|---|---|---|
| 10,801,966 B2 | 10/2020 | Dillingham et al. |
| 2007/0155019 A1 | 7/2007 | Johnson et al. |
| 2007/0263026 A1* | 11/2007 | Shang ............ B41J 2/16552 347/22 |
| 2020/0080880 A1 | 3/2020 | Dillingham et al. |

\* cited by examiner

CHEMICAL LIQUID DISPENSING APPARATUS

CROSS-REFERENCE TO RELATED APPLICATION

This application is based upon and claims the benefit of priority from Japanese Patent Application No. 2019-172694, filed Sep. 24, 2019 the entire contents of which are incorporated herein by reference.

FIELD

Embodiments described herein relate generally to a liquid dispensing apparatus for dispensing chemicals and the like.

BACKGROUND

There is a liquid dispensing apparatus in which a liquid discharging apparatus is incorporated. The liquid discharging apparatus can be filled a liquid (e.g., a chemical solution or liquid chemical) and this liquid can be discharged as droplets or the like. The liquid dispensing apparatus discharges the liquid via a plurality of nozzles provided in the liquid discharging apparatus.

When an impurity such as dust is in the liquid being dispensed, there is a possibility that a nozzle or nozzles may not discharge the liquid as intended during the dispensing process. To check for such a problem, the liquid dispensing apparatus can be operated to discharge liquid from each nozzle on to an inspection medium. The inspection medium can then be evaluated to determine whether the liquid is being appropriately discharged from each nozzle based upon the presence or absence of dots or other patterns formed on the inspection medium by the discharged droplets.

When the liquid is discharged from a plurality of closely spaced nozzles of the liquid discharging apparatus, the dots formed on the inspection medium may combine with each other. Therefore, a user may not be able to appropriately determine whether the liquid is being discharged from each nozzle.

DETAILED DESCRIPTION

In general, according to one embodiment, a liquid dispensing apparatus includes a mounting unit configured to hold a liquid discharging apparatus that discharges liquid from nozzles simultaneously by an operation of an actuator. An inspection media placement region is provided on which an inspection medium can be placed to receive the liquid discharged from the liquid discharging apparatus held by the mounting unit. A controller is configured to control the operation of the actuator to vary a volume of the liquid discharged from each nozzle for a nozzle inspection operation according to a predetermined distance between adjacent nozzles of the liquid discharging apparatus that simultaneously discharge the liquid and a predetermined contact angle for a droplet of the liquid on the inspection medium.

Hereinafter, certain example embodiments will be described with reference to the drawings. Each diagram is a schematic diagram for an embodiment provided for understanding thereof. Although the depicted shapes, dimensions, and ratios between different aspects can be, in general, different from those of an actual implementation, these can be appropriately modified in design.

First Embodiment

A discharge system according to a first embodiment discharges a liquid by a piezo jet method.

Figure 1:
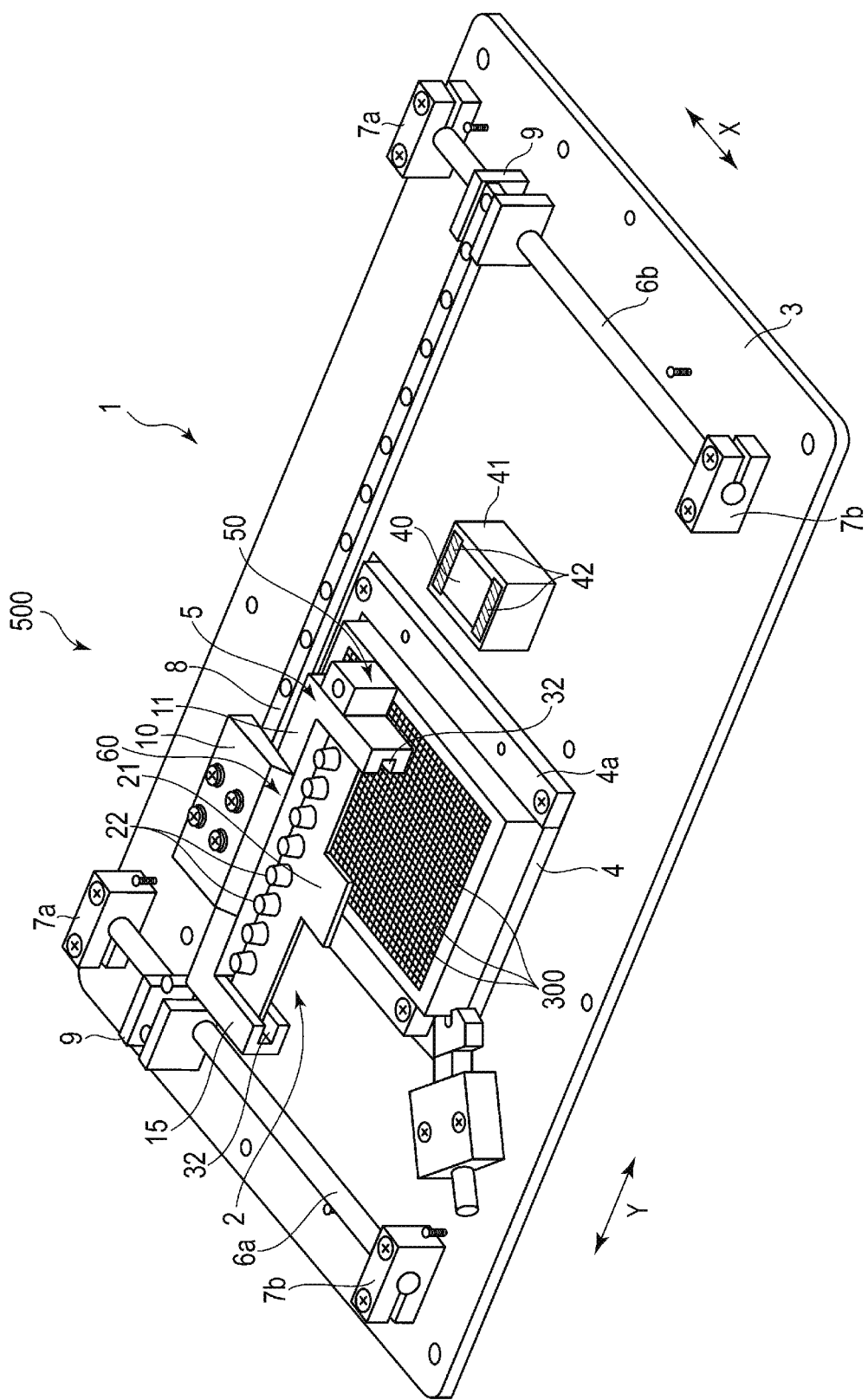
FIG. 1 is a perspective view illustrating a schematic configuration of a discharge system according to a first embodiment.
Figure 2:
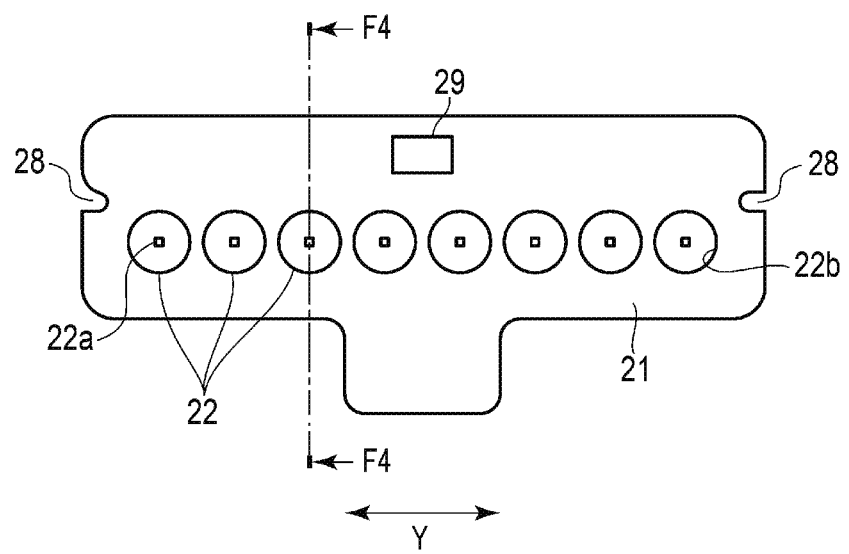
FIG. 2 is a top view (liquid storing container side) of a liquid discharging apparatus.
Figure 3:
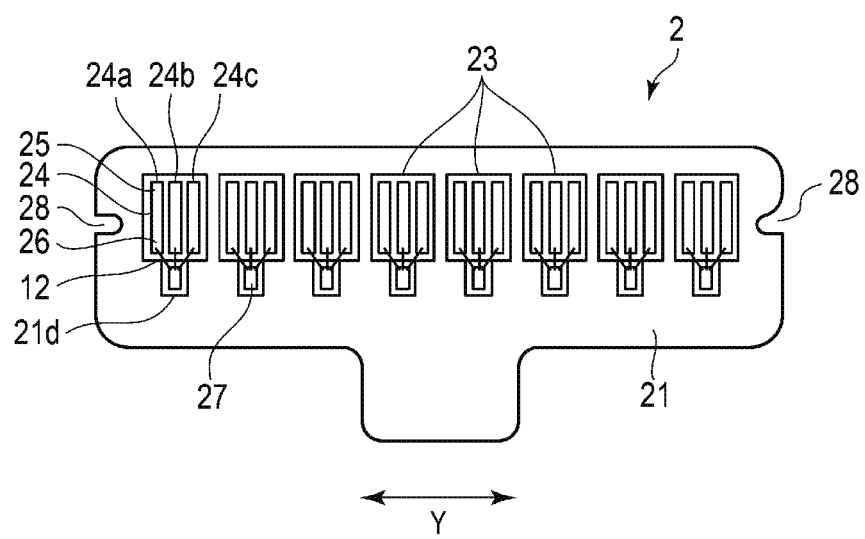
FIG. 3 is a bottom view (liquid discharge side) of the liquid discharging apparatus.
Figure 4:
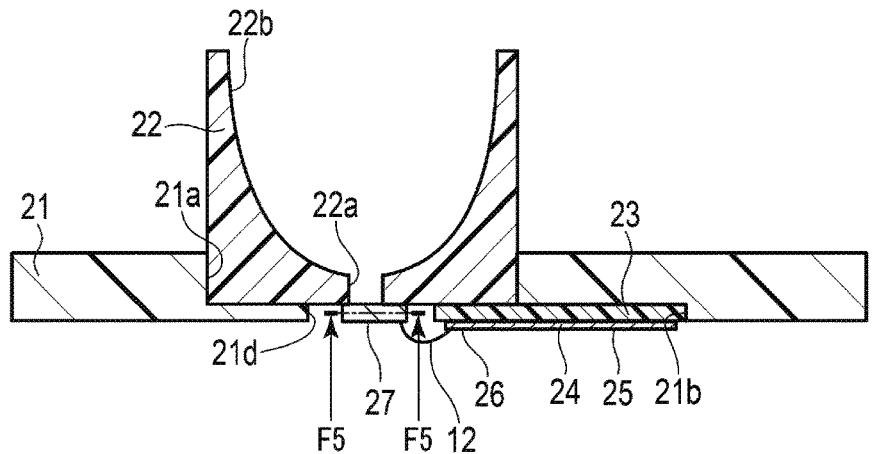
FIG. 4 is a cross-sectional view taken along the line F4-F4 in FIG. 2.
Figure 5:
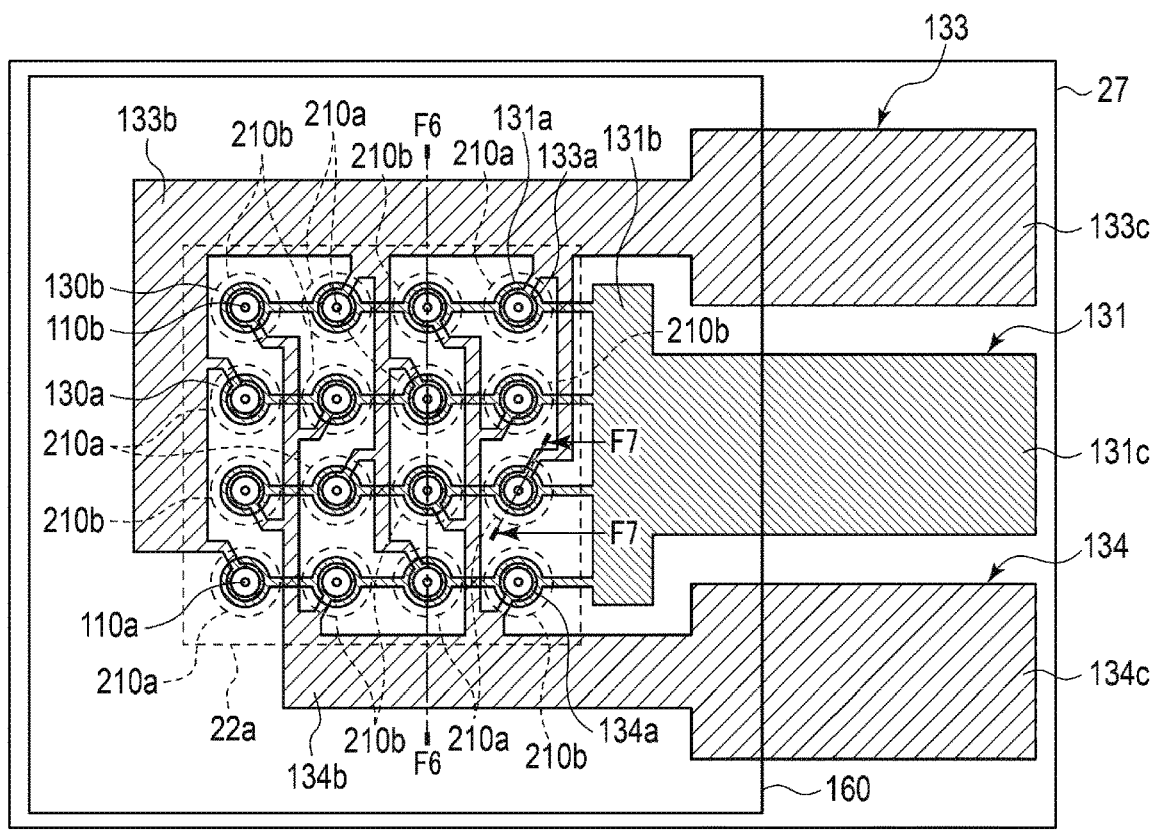
FIG. 5 is a cross-sectional view taken along the line F5-F5 in FIG. 4.
Figure 6:
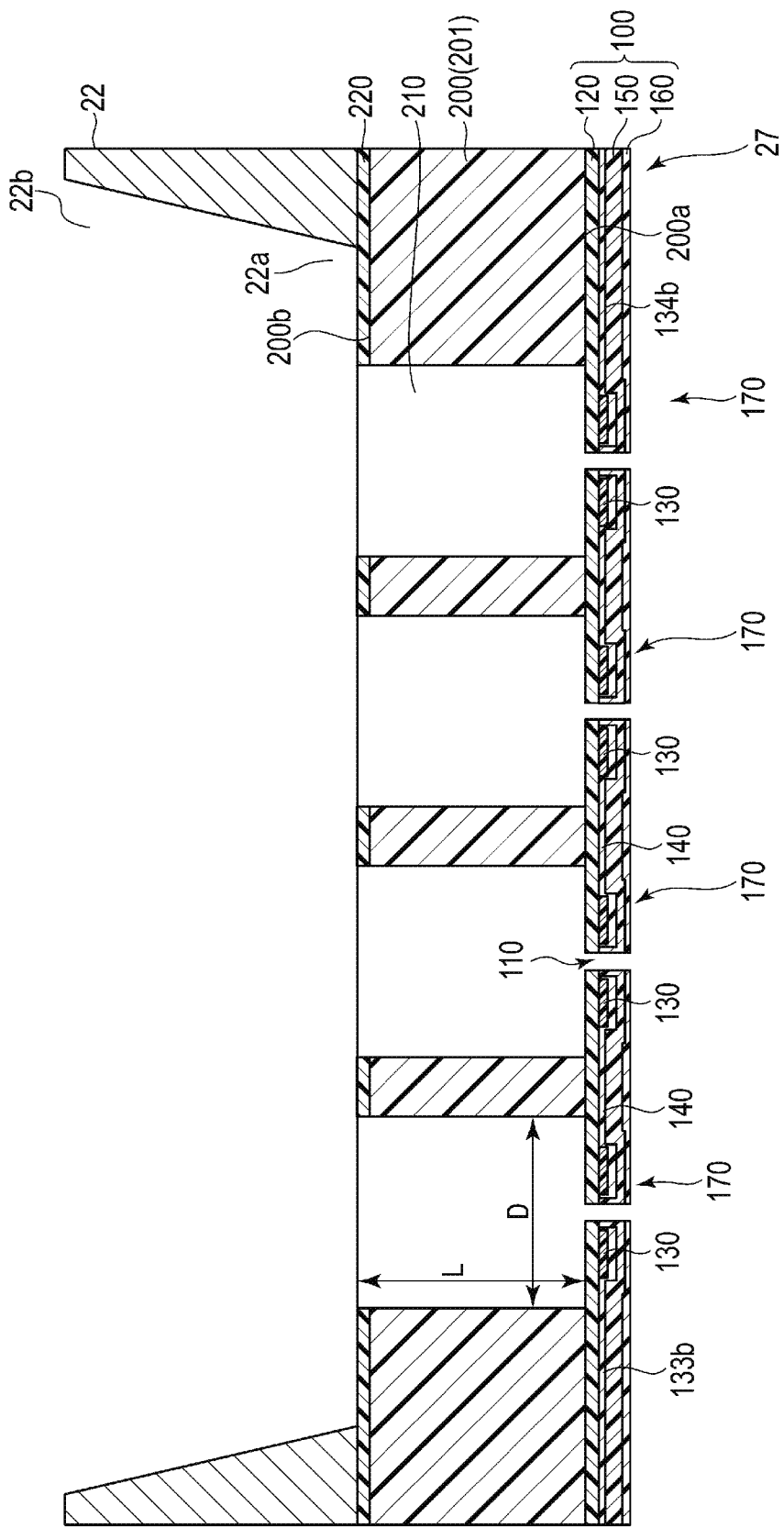
FIG. 6 is a cross-sectional view taken along the line F6-F6 in FIG. 5.
Figure 7:
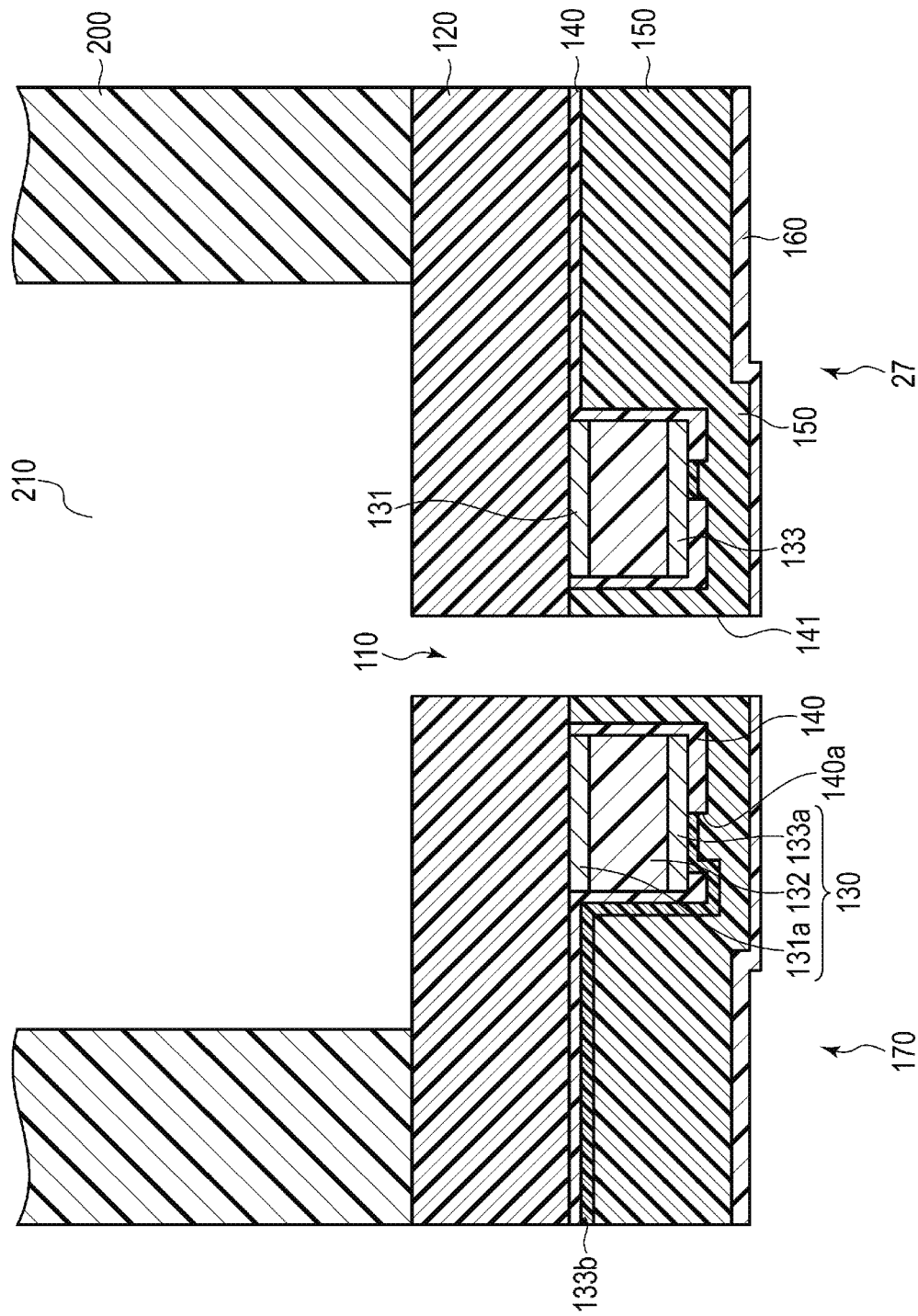
FIG. 7 is a cross-sectional view taken along the line F7-F7 in FIG. 5.

A physical configuration example of the discharge system according to the first embodiment will be described with reference to FIGS. 1 to 7. FIG. 1 is a perspective view illustrating a schematic configuration of a discharge system 500. FIG. 2 is a top view of a liquid discharging apparatus 2. FIG. 3 is a bottom view illustrating a surface from which a droplet of the liquid discharging apparatus 2 is discharged. FIG. 4 is a cross-sectional view taken along the line F4-F4 in FIG. 2. FIG. 5 is a cross-sectional view taken along the line F5-F5 in FIG. 4. FIG. 6 is a cross-sectional view taken along the line F6-F6 in FIG. 5. FIG. 7 is a cross-sectional view taken along the line F7-F7 in FIG. 5.

As illustrated in FIG. 1, the discharge system 500 includes a liquid dispensing apparatus 1, the liquid discharging apparatus 2, and the like. The discharge system 500 may include additional components or aspects other than the configuration illustrated in FIG. 1 or may exclude certain depicted components or aspects from a specific configuration.

The liquid dispensing apparatus 1 controls the liquid discharging apparatus 2 to dispense a liquid (e.g., a chemical solution or the like) filled in the liquid discharging apparatus 2. In the first embodiment, the liquid dispensing apparatus 1 dispenses the liquid into a microplate 4 (also referred to as a dispensing unit) having 1,536 holes (also referred to as wells).

The liquid dispensing apparatus 1 includes a rectangular flat-shaped base 3, a mounting module 5 on which the liquid discharging apparatus 2 is mounted, and an inspection paper placing base 41. Here, a front and back direction of the base 3 is referred to as an X direction, and a left and right direction of the base 3 is referred to as a Y direction. The X direction and the Y direction are orthogonal to each other.

The microplate 4 is fixed to the base 3. A frame-shaped mounting member 4a for detachably mounting the microplate 4 is provided on the base 3. On the base 3, a pair of left and right X-direction guide rails 6a and 6b extending in the X direction are respectively provided on opposite sides of the mounting member 4a of the microplate 4. Opposite ends of the respective X-direction guide rails 6a and 6b are fixed to fixing bases 7a and 7b protruding on the base 3.

A Y-direction guide rail 8 extending in the Y direction is provided between the X-direction guide rails 6a and 6b. Opposite ends of the Y-direction guide rail 8 are fixed to an X-direction moving base 9 that can slide in the X direction along the X-direction guide rails 6a and 6b.

The Y-direction guide rail 8 is provided with a Y-direction moving base 10 on which the mounting module 5 can move in the Y direction along the Y-direction guide rail 8. The mounting module 5 is mounted on the Y-direction moving base 10. The liquid discharging apparatus 2 is fixed to the mounting module 5.

An operation in which the Y-direction moving base 10 moves in the Y direction along the Y-direction guide rail 8 and an operation in which the X-direction moving base 9 moves in the X direction along the X-direction guide rails 6a and 6b are combined with each other, whereby the liquid discharging apparatus 2 is movably supported at any positions in the orthogonal XY direction.

A slit 32 for fixing the liquid discharging apparatus 2 is formed in the mounting module 5. When the liquid discharging apparatus 2 is inserted into the slit 32 from the front opening side of the slit 32, the liquid discharging apparatus 2 is fixed to the liquid dispensing apparatus 1.

The mounting module 5 includes a drive circuit 11, an image photographing unit 50, a reader 60, and the like.

The drive circuit 11 drives the liquid discharging apparatus 2 based upon a signal from a processor 15 which will be described later. For example, the drive circuit 11 supplies a voltage or the like to the liquid discharging apparatus 2 for causing the liquid discharging apparatus 2 to discharge the liquid.

The reader 60 reads a code 29 of the liquid discharging apparatus 2. For example, the reader 60 photographs (images) the code 29 and then decodes the code 29 in the acquired image. In some examples, the reader 60 may be referred to as a barcode reader 60. The reader 60 transmits the decoding result to the processor 15.

For example, the reader 60 is, or includes, a photographing device such as a CCD. The reader 60 may also include a light for illuminating the code 29 for reading or the like.

The reader 60 is installed at a position corresponding to a position of the code 29 on the liquid discharging apparatus 2. That is, when the liquid discharging apparatus 2 is set on the mounting module 5, the reader 60 is installed at a position where the reader 60 can read the code 29.

The image photographing unit 50 photographs an inspection pattern generated by liquid droplets discharged from the liquid discharging apparatus 2 on an inspection paper 40. The image photographing unit 50 transmits a photographed image to the processor 15. For example, the image photographing unit 50 is a CCD camera or a small microscope mounted with a zoom adjusting lens.

The inspection paper placing base 41 is a base on which the inspection paper 40 (an inspection medium) is placed. The inspection paper placing base 41 is disposed in a region where the liquid discharging apparatus 2 on the base 3 can move. Here, the inspection paper placing base 41 is disposed at a position moved from the microplate 4 in the Y direction.

The inspection paper 40 forms droplet dots by the liquid droplets discharged from a plurality of nozzles provided in the liquid discharging apparatus 2.

The inspection paper 40 includes a receiving layer that receives the liquid droplet. For example, the receiving layer has a characteristic that a portion that stores the liquid droplet having translucency is colored or discolored. As the inspection paper 40, water sensitive paper made by Spraying Systems company is used as an example.

The inspection paper 40 is normally a light yellow color, and is discolored to a deep blue color where the liquid lands. In addition to water, phosphate-buffered saline solutions, aqueous glycerin solutions, or even dimethyl sulfoxide, which is an organic solvent, is dropped, the inspection paper 40 will be discolored to the deep blue color. The liquid droplet adhering to the inspection paper 40 maintains a dome-like (hemispherical or semi-hemispherical) shape. Even after the liquid droplet adhering thereto partially or completely volatilizes, an inspection pattern having the deep blue color on the inspection paper 40 is maintained.

The material and form of the inspection medium are not particularly limited. A non-absorbent medium such as a glass plate, a metal plate, and a synthetic resin sheet that does not absorb the dropped liquid droplet may be used in some examples. The liquid droplet immediately after dispensing forms the dome shape on such a non-absorbent inspection medium, but with an absorbent medium, such as paper, the liquid droplet may be absorbed over time. But, in general, various media types regardless of the material and shape may be utilized in this context.

As illustrated in FIG. 1, the inspection paper placing base 41 includes an inspection paper holding member 42 for fixing the inspection paper 40 to the inspection paper placing base 41. For example, the inspection paper holding member 42 is formed of a rectangular paperweight. The inspection paper holding member 42 may have a function of fixing and holding the inspection paper, and may be a clip formed on the inspection paper placing base 41.

It is desirable that a height of the inspection paper placing base 41 is approximately the same as an upper surface part of the microplate 4 where a well opening 300 of the microplate 4 is provided. In this case, there is no requirement to change a height at which the liquid discharging apparatus 2 drops the liquid droplet into the well openings 300 of the microplate 4 and a height at which the liquid discharging apparatus 2 drops the liquid droplet on the inspection paper 40 on the inspection paper placing base 41.

The liquid discharging apparatus 2 discharges the liquid based upon the control of the liquid dispensing apparatus 1.

The liquid discharging apparatus 2 has a flat plate-shaped base member 21 which is a rectangular plate-shaped plate body. As illustrated in FIG. 2, a plurality of liquid storing containers 22 are arranged in a line in the Y direction on the front side of the base member 21. In this example embodiment, the liquid discharging apparatus 2 includes eight liquid storing containers 22, but the number thereof is not limited to eight. The liquid storing container 22 is a bottomed cylindrical container with an upper surface opened as illustrated in FIG. 4. On the front surface side of the base member 21, a cylindrical recessed part 21a for the liquid storing container is formed at a position corresponding to each liquid storing container 22.

A bottom part of the chemical liquid storing container 22 is bonded and fixed to the recessed part 21a. A lower surface opening unit 22a serving as a chemical liquid outlet is formed at a center position at the bottom part of the chemical liquid storing container 22. An opening area of an upper surface opening unit 22b of the chemical liquid storing container 22 is larger than an opening area of the lower surface opening unit 22a of the chemical liquid outlet.

As illustrated in FIG. 2, mounting fixing notches 28 for being mounted on and fixed to the mounting module 5 are respectively formed at opposite ends of the base member 21. The mounting fixing notch 28 is engaged with the mounting module 5. The two notches 28 of the base member 21 are formed in a semi-elliptical notch shape. The mounting fixing notch 28 may be a semi-circular, semi-elliptical, or triangular notch shape. In the embodiment, the shapes of the two notches 28 are different from each other. Accordingly, the right and left shapes of the base member 21 are different, such that an attitude of the base member 21 is easily confirmed.

The code 29 provides an identifier (identification information) for specifying a particular liquid discharging apparatus 2. For example, the code 29 is generated by encoding a character string, a numerical value, or a combination thereof. That is, the code 29 provides the identifier for specifying a liquid discharging apparatus 2 when decoded. The code 29 can be a one-dimensional code, a two-dimensional code, or the like.

The code 29 is provided to the liquid discharging apparatus 2 in advance, for example, when the liquid discharging apparatus 2 is manufactured.

On the reverse surface side of the base member 21 as illustrated in FIG. 3, the same number of electrical substrates 23 as that of the liquid storing containers 22 are arranged in a row in the Y direction. The electrical substrate 23 is a rectangular flat plate member. On the reverse surface side of the base member 21, as illustrated in FIG. 4, a rectangular recessed part 21b for the electrical substrate for mounting the electrical substrate 23 and a liquid discharging array unit opening 21d communicating with the recessed part 21b for the electrical substrate are formed. A base end of the recessed part 21b for the electrical substrate extends up to a position near an upper end (a position near a right end in FIG. 4) in FIG. 3 of the base member 21. A tip part of the recessed part 21b for the electrical substrate extends up to a position overlapping a portion of the liquid storing container 22 as illustrated in FIG. 4. The electrical substrate 23 is bonded and fixed to the recessed part 21b for the electrical substrate.

On the electrical substrate 23, an electrical substrate wiring 24 is patterned and formed on a surface opposite to a bonding and fixing surface of the recessed part 21b for the electrical substrate. The electrical substrate wiring 24 is formed of wiring patterns 24a, 24b, and 24c, and the like. An electrode connection terminal 26 connected to a drive element 130 (a first drive element 130a and a second drive element 130b) via a wiring wire 12 is formed at one end of the wiring patterns 24a, 24b, and 24c. The wiring patterns 24a, 24b, and 24c are respectively connected to a first upper electrode 133 (a first conductive wire), a lower electrode 131, and a second upper electrode 134 (a second conductive wire) illustrated in FIG. 5 via the electrode connection terminal 26.

A control signal input terminal 25 for inputting the drive signal from the drive circuit 11 is formed at one end of the electrical substrate wiring 24. For example, the control signal input terminal 25 has a shape capable of being connected to a leaf spring connector or the like.

The drive signal from the drive circuit 11 is inputted to the wiring pattern 24a and the wiring pattern 24b. That is, the drive signal from the drive circuit 11 is inputted as a potential difference between the first upper electrode 133 and the lower electrode 131.

The drive signal from the drive circuit 11 is inputted to the wiring pattern 24b and the wiring pattern 24c. That is, the drive signal from the drive circuit 11 is inputted as a potential difference between the second upper electrode 134 and the lower electrode 131. Here, it is assumed that the lower electrode 131 is maintained at a constant voltage.

The first upper electrode 133 is formed of an electrode unit 133a, a wiring unit 133b, and a terminal unit 133c. The terminal unit 133c is electrically connected to one end of the wiring unit 133b. The other end of the wiring unit 133b is electrically connected to the electrode unit 133a.

The second upper electrode 134 is formed of an electrode unit 134a, a wiring unit 134b, and a terminal unit 134c. The terminal unit 134c is electrically connected to one end of the wiring unit 134b. The other end of the wiring unit 134b is electrically connected to the electrode unit 134a.

The first upper electrode 133 and the second upper electrode 134 are formed of a Pt thin film. As other electrode materials thereof, it is also possible to use Ni, Cu, Al, Ti, W, Mo, Au, SrRuO3, and the like. As another film formation method, vapor deposition and plating can also be used therefor. The first upper electrode 133 and the second upper electrode 134 can also be used by laminating various metals.

The lower electrode 131 is formed of an electrode unit 131a, a wiring unit 131b, and a terminal unit 131c. The terminal unit 131c is electrically connected to one end of the wiring unit 131b. The other end of the wiring unit 131b is electrically connected to the electrode unit 131a.

The lower electrode 131 is formed with a thickness of 0.5 μm by laminating titanium (Ti) and platinum (Pt) by, for example, a sputtering method. The film thickness of the lower electrode 131 is approximately in the range of 0.01 to 1 μm. The lower electrode 131 can use other materials such as Ni, Cu, Al, Ti, W, Mo, Au, and SrRuO3. The lower electrode 131 can also be used by laminating various metals.

The base member 21 is provided with the liquid discharging array unit opening 21d. As illustrated in FIG. 3, the liquid discharging array unit opening 21d is a rectangular opening unit and is formed at a position overlapping the recessed part 21a for the liquid storing container 22 on the reverse surface side of the base member 21.

The liquid discharging array 27 is bonded and fixed to the lower surface of the liquid storing container 22 and covers the lower surface opening unit 22a. The liquid discharging array 27 is disposed at a position corresponding to the liquid discharging array unit opening 21d of the base member 21.

As illustrated in FIG. 5, a plurality of first pressure chambers 210a and a plurality of second pressure chambers 210b are formed in a lattice shape in the liquid discharging array 27. Here, the first pressure chamber 210a and the second pressure chamber 210b are arranged in 4×4 rows.

The plurality of first pressure chambers 210a are formed at predetermined gaps. The plurality of first pressure chambers 210a are formed at positions diagonally opposite to each other.

The second pressure chamber 210b is adjacent to the first pressure chamber 210a. As illustrated in FIG. 5, the second pressure chamber 210b is adjacent to the first pressure chamber 210a in an X-axis direction and a Y-axis direction. That is, the first pressure chamber 210a and the second pressure chamber 210b are alternately formed in the X-axis direction and the Y-axis direction.

As illustrated in FIG. 6, the liquid discharging array 27 is formed by laminating a nozzle plate 100 and a pressure chamber structure 200. The nozzle plate 100 includes nozzles 110 for discharging the liquid (e.g., a first nozzle 110a and a second nozzle 110b); a diaphragm 120; drive elements 130 (e.g., a first drive element 130a and a second drive element 130b); an insulating film 140 which insulates the lower electrode 131, the wiring unit 133b of the first upper electrode 133, and the wiring unit 134b of the second upper electrode 134; a protective film 150 (also referred to as a protective layer 150); and a liquid repellent film 160. The actuator 170 is formed by the diaphragm 120 and the drive element 130. The nozzles 110 according to the example embodiment are positioned inside the lower surface opening unit 22a of the liquid outlet of the liquid storing container 22.

The diaphragm 120 is deformed in a thickness direction by the operation of the planar drive element 130. The liquid discharging apparatus 2 discharges the liquid supplied to the nozzle 110 by a pressure change in the pressure chamber 210 generated by a change in the volume of the pressure chamber 210 caused by the deformation of the diaphragm 120.

The volume of the first pressure chamber 210a is changed by driving the first drive element 130a. The first nozzle 110a communicates with the first pressure chamber 210a. The liquid in the first pressure chamber 210a is discharged through the first nozzle 110a. The first drive element 130a is electrically connected to the electrode unit 133a and the electrode unit 131a.

The volume of the second pressure chamber 210b is changed by driving the second drive element 130b. The second nozzle 110b communicates with the second pressure chamber 210b. The liquid in the second pressure chamber 210b is discharged through the second nozzle 110b. The second drive element 130b is electrically connected to the electrode unit 134a and the electrode unit 131a.

That is, the first drive element 130a is electrically connected to the drive circuit 11 by the first upper electrode 133 and the lower electrode 131. The second drive element 130b is electrically connected to the drive circuit 11 by the second upper electrode 134 and the lower electrode 131.

The plurality of nozzles 110 are arranged in 4×4 rows with respect to the well opening 300 of one 1,536-Well microplate. For example, an opening size of the well opening 300 of the 1,536-Well microplate is a square whose one side is about 1.7 mm. A distance between the centers of the neighboring nozzles 110 among the plurality of nozzles 110 arranged in 4×4 rows is 0.25 mm. A size of the nozzles 110 of 4×4 rows disposed in the well opening 300 is 0.75 mm in the X direction and 0.75 mm in the Y direction, and is smaller than the size of the well opening 300 of the 1,536-Well microplate.

The diaphragm 120 is formed integrally with, for example, the pressure chamber structure 200. When a silicon wafer 201 for manufacturing the pressure chamber structure 200 is processed by heating in an oxygen atmosphere, a silicon oxide (SiO2) film is formed on a surface of the silicon wafer 201. The diaphragm 120 uses the silicon oxide (SiO2) film on the surface of the silicon wafer 201 formed by the heat processing in the oxygen atmosphere. The diaphragm 120 may be formed by forming the silicon oxide (SiO2) film on the surface of the silicon wafer 201 by a chemical vapor deposition method (a CVD method).

A film thickness of the diaphragm 120 is desirably in the range of 1 to 30 μm. The diaphragm 120 can also use a semiconductor material such as silicon nitride (SiN) or aluminum oxide (Al2O3) instead of the silicon oxide (SiO2) film.

The drive element 130 is formed in each nozzle 110. The drive element 130 has an annular shape surrounding the nozzle 110. A shape of the drive element 130 is not limited thereto, and may have, for example, a C-shape in which a part of an annular ring is cut off.

As illustrated in FIG. 7, the drive element 130 includes the electrode unit 131a and the electrode unit 133a or the electrode unit 134a with a piezoelectric film 132 which is a piezoelectric body interposed therebetween.

In FIG. 7, the piezoelectric film 132 is formed between the electrode unit 131a and the electrode unit 133a in the first drive element 130a. The piezoelectric film 132 is formed between the electrode unit 131a and the electrode unit 134a in the second drive element 130b.

The electrode unit 131a, the piezoelectric film 132, and the electrode unit 133a or the electrode unit 134a are coaxial with the nozzle 110 and are a circular pattern having the same size.

The piezoelectric film 132 is, for example, a piezoelectric material having a thickness of 2 μm. The piezoelectric film 132 is formed of Pb (Zr, Ti) O3: lead zirconate titanate (PZT). The piezoelectric film 132 is, for example, coaxial with the nozzle 110, and has an annular shape having an outer diameter of 133 μm and an inner diameter of 42 μm which is the same shape as that of the electrode unit 131a. The film thickness of the piezoelectric film 132 is approximately in the range of 1 to 5 microns (μm). The piezoelectric film 132 can also use piezoelectric materials such as, for example, PbTiO3: lead titanate (PTO), Pb (Mg⅓Nb⅔) O3-PbTiO3 (PMNT), Pb (Zn⅓Nb⅔) O3-PbTiO3 (PZNT), ZnO, and AlN.

The piezoelectric film 132 generates polarization in the thickness direction. When an electric field in the same direction as the polarization is applied to the piezoelectric film 132, the piezoelectric film 132 expands and contracts in a direction orthogonal to an electric field direction. That is, the piezoelectric film 132 contracts or expands in the direction orthogonal to the film thickness.

The nozzle plate 100 includes the insulating film 140 which insulates the lower electrode 131 from the first upper electrode 133 or the second upper electrode 134. The insulating film 140 covers the peripheries of the electrode unit 131a, the piezoelectric film 132, and the electrode unit 133a in a region where the first drive element 130a is formed. The insulating film 140 covers the peripheries of the electrode unit 131a, the piezoelectric film 132, and the electrode unit 134a in a region where the second drive element 130b is formed.

The insulating film 140 covers the wiring unit 131b of the lower electrode 131. The insulating film 140 covers the diaphragm 120 in a partial region of the wiring unit 133b of the first upper electrode 133 and the wiring unit 134b of the second upper electrode 134. The insulating film 140 includes a contact unit 140a which is an opening unit for electrically connecting the electrode unit 133a to the wiring unit 133b of the first upper electrode 133 or the electrode unit 134a to the wiring unit 134b of the second upper electrode 134.

The protective film 150 includes a cylindrical liquid passing unit 141 communicating with (fluidly connected to) the nozzle 110.

The nozzle plate 100 includes the liquid repellent film 160 covering the protective film 150. The liquid repellent film 160 is formed by spin-coating, for example, a silicon-containing resin having a characteristic of repelling the liquid. The liquid repellent film 160 can also be formed of a material having a characteristic of repelling the liquid such as a fluorine-containing resin.

The pressure chamber structure 200 includes a warpage reduction film 220 which is a layer on a surface of the side opposite to the diaphragm 120. The pressure chamber structure 200 includes a pressure chamber 210 which penetrates the warpage reduction film 220 and reaches to a position of the diaphragm 120. The pressure chamber 210 communicates with (is fluidly connected to) a nozzle 110. The pressure chamber 210 is formed in, for example, a circular shape positioned coaxially with the nozzle 110.

The pressure chamber 210 includes an opening unit (also referred to as a liquid supply port) connecting with the lower surface opening unit 22a of the liquid storing container 22. It is desirable that a size L in a depth direction of the opening unit of the pressure chamber 210 is larger than a size D in a width direction thereof. A pressure applied to the liquid in the pressure chamber 210 by the vibration of the diaphragm 120 will be less transmitted to the liquid storing container 22 by setting the size L to be greater the size D.

The side of the pressure chamber structure 200 where the diaphragm 120 is disposed is a first surface 200a, and the side where the warpage reduction film 220 is disposed is a second surface 200b. The liquid storing container 22 adheres to the second surface 200b side (side with the warpage reduction film 220) of the pressure chamber structure 200 with, for example, an epoxy type adhesive. The pressure chamber 210 communicates with the lower surface opening unit 22a of the liquid storing container 22 via the opening unit on the side of the warpage reduction film 220.

Figure 8:
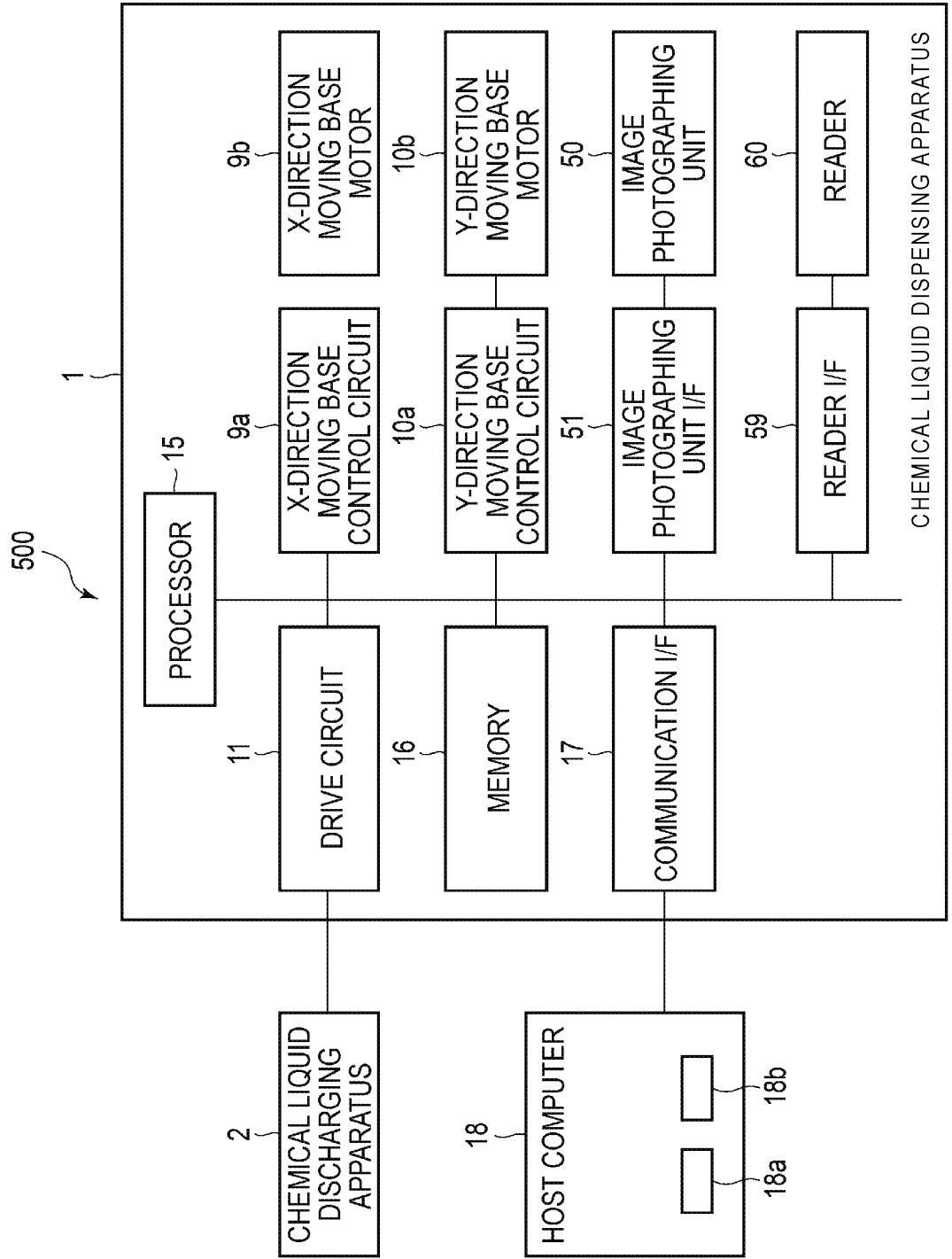
FIG. 8 is a block diagram illustrating a control system of a discharge system.

FIG. 8 is a block diagram illustrating a configuration example of a control system of the discharge system 500. As illustrated in FIG. 8, the discharge system 500 includes the liquid dispensing apparatus 1, the liquid discharging apparatus 2, and a host computer 18.

The host computer 18 controls the liquid dispensing apparatus 1 according to an input operation from an operator. The host computer 18 includes an operation unit 18a and a display unit 18b. The host computer 18 is configured with a processor, a RAM, a ROM, an NVM, and the like.

The operation unit 18a receives an input operation from the operator. The operation unit 18a is, for example, a keyboard, a mouse, or a touch panel.

The display unit 18b displays various information under the control of the processor 15. The display unit 18b is formed of, for example, a liquid crystal monitor. When the operation unit 18a is configured with a touch panel or the like, the display unit 18b may be formed integrally with the operation unit 18a.

The host computer 18 receives various operation instructions through user inputs through the operation unit 18a. For example, the host computer 18 receives an input operation indicating that the liquid storing container 22 is filled with the liquid. The host computer 18 receives an input operation of an instruction (operation instruction) for discharging the liquid from the liquid storing container 22.

When receiving the operation instruction for discharging the liquid, the host computer 18 transmits a discharge signal to the liquid dispensing apparatus 1.

The host computer 18 may receive an operation instruction for each of the liquid storing containers 22. For example, the host computer 18 may receive an operation instruction indicating that each of the liquid storing containers 22 has been or is filled with the liquid or an operation instruction for discharging the liquid therefrom.

As illustrated in FIG. 8, the liquid dispensing apparatus 1 includes an X-direction moving base control circuit 9a, an X-direction moving base motor 9b, a Y-direction moving base control circuit 10a, a Y-direction moving base motor 10b, the drive circuit 11, the processor 15 (a control unit), a memory 16, a communication interface 17, the image photographing unit 50, an image photographing unit interface 51, the reader 60, and a reader interface 59. The processor 15 and the X-direction moving base control circuit 9a, the Y-direction moving base control circuit 10a, the drive circuit 11, the memory 16, the communication interface 17, the image photographing unit interface 51, and the reader interface 59 are connected to each other via a data bus.

The X-direction moving base control circuit 9a is connected to the X-direction moving base motor 9b. The Y-direction moving base control circuit 10a is connected to the Y-direction moving base motor 10b. The image photographing unit interface 51 is connected to the image photographing unit 50. The reader interface 59 is connected to the reader 60.

The liquid dispensing apparatus 1 may be provided additional components or aspects than those depicted in the configuration illustrated in FIG. 8, or certain depicted components may be excluded or omitted from a specific configuration of other examples.

The processor 15 has a function of controlling operations of the overall liquid dispensing apparatus 1. The processor 15 may include an internal cache, various interfaces, and the like. The processor 15 realizes various processing by executing a program stored in the internal cache, the memory 16, or the like in advance.

A part of various functions realized in such a manner that the processor 15 executes the program may be realized by a hardware circuit. In this case, the processor 15 controls a function executed by the hardware circuit.

The memory 16 stores various data. For example, the memory 16 stores a control program, control data, and the like. The control program and the control data are incorporated in advance in response to the specification of the liquid dispensing apparatus 1. The control program is, for example, a program that implements, or executes instructions for providing, a function or functions performed by the liquid dispensing apparatus 1.

The memory 16 temporarily stores data being processed by the processor 15 or the like. The memory 16 may store data necessary for executing an application program, an execution result of the application program, and the like.

The communication interface 17 is an interface for transmitting and receiving data to and from the host computer 18. For example, the communication interface 17 is connected to the host computer 18 via a wired or wireless line. For example, the communication interface 17 may support local area network (LAN) connection or the like.

The X-direction moving base control circuit 9a drives the X-direction moving base motor 9b based upon a signal from the processor 15. The X-direction moving base control circuit 9a supplies the signal or power to the X-direction moving base motor 9b, thereby driving the X-direction moving base motor 9b.

The X-direction moving base motor 9b moves the X-direction moving base 9 in the X direction. For example, the X-direction moving base motor 9b is connected to the X-direction moving base 9 via a gear or the like, and moves the X-direction moving base 9 in the X direction.

The Y-direction moving base control circuit 10a drives the Y-direction moving base motor 10b based upon the signal from the processor 15. The Y-direction moving base control circuit 10a supplies the signal or power to the Y-direction moving base motor 10b, thereby driving the Y-direction moving base motor 10b.

The Y-direction moving base motor 10b moves the Y-direction moving base 10 in the Y direction. For example, the Y-direction moving base motor 10b is connected to the Y-direction moving base 10 via a gear or the like, and moves the Y-direction moving base 10 in the Y direction.

The image photographing unit interface 51 is an interface for transmitting and receiving data to and from the image photographing unit 50. For example, the image photographing unit interface 51 transmits a control signal for instructing the image photographing unit 50 to photograph according to the control of the processor 15. The image photographing unit interface 51 transmits an image photographed by the image photographing unit 50 to the processor 15. The image photographing unit interface 51 may supply power to the image photographing unit 50.

The reader interface 59 is an interface for transmitting and receiving data to and from the reader 60. For example, the reader interface 59 transmits an identifier from the reader 60 to the processor 15. The reader interface 59 may supply power to the reader 60.

The liquid discharging apparatus 2, the drive circuit 11, and the reader 60 are as described hereinabove.

Next, operational aspects of the liquid dispensing apparatus 1 will be described. The operational, or functional, aspects performed by the liquid dispensing apparatus 1 can be realized by processor 15 executing a program stored in the memory 16 or the like.

First, the processor 15 acquires a distance L between the adjacent nozzles 110 among the plurality of nozzles that simultaneously discharge the liquid.

Here, distance L is distance from the center of a given nozzle 110 to the center of the adjacent nozzle 110 that simultaneously discharges the liquid.

The processor 15 causes the plurality of first nozzles 110a to simultaneously discharge the liquid. The processor 15 causes the plurality of second nozzles 110b to simultaneously discharge the liquid. That is, the processor 15 acquires, as the distance L, a distance between the adjacent first nozzles 110a (a first distance La) and a distance between the adjacent second nozzles 110b (a second distance Lb).

The processor 15 determines whether to inspect the nozzle 110. That is, the processor 15 determines whether or not to check whether the nozzle 110 is clogged with an impurity or the like.

For example, the processor 15 causes each nozzle 110 to discharge the liquid to each well opening 300. The processor 15 determines whether the number of times of discharging the liquid reaches a predetermined number of times. When the number of times of discharging the liquid reaches the predetermined number of times, the processor 15 determines that the inspection of the nozzle 110 has been performed.

The processor 15 may determine that the inspection of the nozzle 110 is performed according to a signal from the host computer 18.

After determining that the inspection of the nozzle 110 has been performed, the processor 15 reads the code 29 of the liquid discharging apparatus 2 by using the reader 60. After reading the code 29, the processor 15 acquires the distance L based upon an identifier obtained by decoding the code 29.

For example, the memory 16 stores a table in which the identifier and the distance L are associated with each other. The processor 15 acquires the distance L corresponding to the identifier with reference to the table. The processor 15 may acquire the distance L corresponding to the identifier from an external apparatus such as the host computer 18.

The processor 15 may acquire the identifier from a wireless tag such as an RF-ID or an IC chip. For example, the liquid discharging apparatus 2 includes the wireless tag. The processor 15 acquires the identifier from the wireless tag through the reader.

The processor 15 may acquire information indicating the distance L inputted by a user to the operation unit 18a or the like.

A method in which the processor 15 acquires the distance L is not limited to a specific method.

The processor 15 has a function of acquiring a type of the liquid being discharged from the liquid discharging apparatus 2 (that is, the type or other identity of the liquid that was put into the liquid storing container 22).

The processor 15 acquires information indicating a type of the liquid as inputted by the user to the operation unit 18a or the like. For example, the user inputs the type of the liquid to the operation unit 18a of the host computer 18 before performing a discharge operation to the well opening 300. The processor 15 acquires the information indicating the inputted type from the host computer 18.

The processor 15 has a function of calculating a discharge amount V at which droplet dots formed by the liquid discharged from the nozzle 110 on the inspection paper 40 do not contact each other.

First, the processor 15 acquires a contact angle between the droplet dot and the inspection paper 40 based upon the acquired type of the liquid. The contact angle is an angle formed between a liquid surface of the droplet dot formed by the liquid and the inspection paper 40. That is, the contact angle is an angle at an end point of the droplet dot when the droplet dot adhering to the inspection paper 40 is observed from the side.

Figure 9:
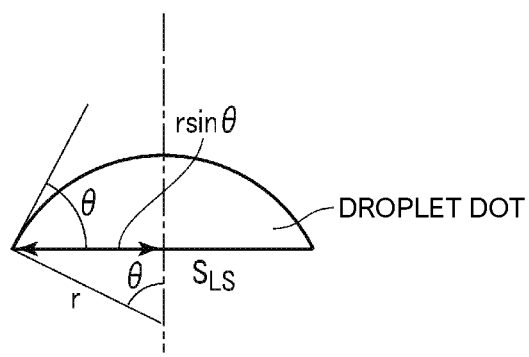
FIG. 9 is a diagram illustrating a shape of a droplet dot.

FIG. 9 illustrates a state of the droplet dot having the contact angle of 90 degrees or less. In FIG. 9, θ indicates the contact angle. r indicates a radius of a sphere forming the droplet dot. As illustrated in FIG. 9, the radius of the droplet dot (the radius when the droplet dot is observed from above) becomes r·sin θ.

Figure 10:
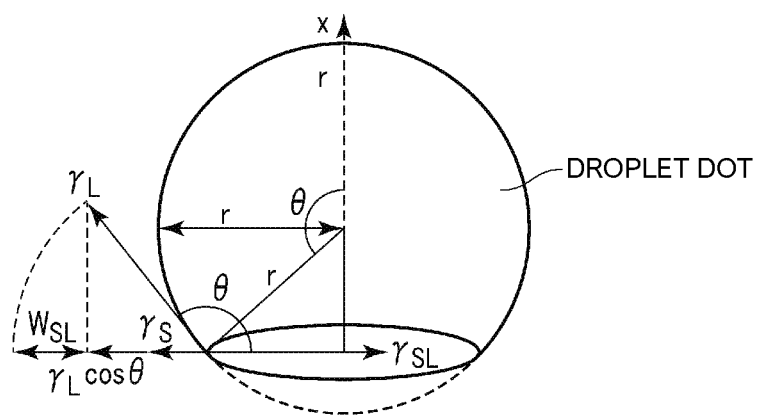
FIG. 10 is a diagram illustrating a shape of the droplet dot.

FIG. 10 illustrates a state of the droplet dot having the contact angle of 90 degrees or more. In FIG. 10, θ indicates the contact angle. r indicates the radius of the sphere forming the droplet dot. As illustrated in FIG. 10, the radius of the droplet dot becomes r.

For example, the memory 16 stores a table in which the type of the liquid and the contact angle are associated with each other. The processor 15 acquires the contact angle corresponding to the type of the liquid with reference to the table. The processor 15 may acquire the contact angle corresponding to the type of the liquid from an external apparatus such as the host computer 18.

The processor 15 may acquire the contact angle based upon the type of the liquid and the type of the inspection paper 40. The memory 16 stores a table in which the type of the liquid and the type of the inspection paper 40 are associated with the contact angle. The processor 15 acquires the contact angle corresponding to the type of the liquid and the type of the inspection paper 40 by reference to the table. The processor 15 may acquire the contact angle corresponding to the type of the liquid and the type of the inspection paper 40 from the external apparatus such as the host computer 18.

The processor 15 may acquire information indicating the contact angle inputted by the user to the operation unit 18a or the like.

A method in which the processor 15 acquires the contact angle is not limited to a specific method.

After acquiring the contact angle, the processor 15 calculates the discharge amount V based upon the distance L and the contact angle.

First, a case in which the contact angle is less than 90 degrees will be described.

A volume of the droplet dot is calculated by the following Equation (1).

$$V = \pi r^3 \left( \frac{2}{3} - \cos \theta + \frac{1}{3} \cos^3 \theta \right) \quad \text{[Equation 1]}$$

Here, r indicates the radius of the sphere forming the droplet dot.

From Equation (1), r is calculated by the following Equation (2).

$$r = \left[ \frac{V}{\pi \left( \frac{2}{3} - \cos \theta + \frac{1}{3} \cos^3 \theta \right)} \right]^{1/3} \quad \text{[Equation 2]}$$

In order to cause the droplet dots not to contact (coalesce with) each other, twice the radius of the droplet dot should be smaller than the distance L. That is, $2r \cdot \sin \theta < L$ may be used.

Therefore, when the following Equation (3) is satisfied, the droplet dots do not contact each other.

$$L > 2 \left[ \frac{V}{\pi \left( \frac{2}{3} - \cos \theta + \frac{1}{3} \cos^3 \theta \right)} \right]^{\frac{1}{3}} \times \sin \theta \quad \text{[Equation 3]}$$

When Equation (3) is solved for V, the following Equation (4) is obtained.

$$V < \frac{\left( \frac{L}{\sin \theta} \right)^3 \times \pi \left( \frac{2}{3} - \cos \theta + \frac{1}{3} \cos^3 \theta \right)}{8} \quad \text{[Equation 4]}$$

The processor 15 calculates the discharge amount V that satisfies Equation (4).

Next, a case in which the contact angle is 90 degrees or more will be described. Equations (1) and (2) are the same even when the contact angle is 90 degrees or more.

In order to cause the droplet dots not to contact each other, twice the radius of the droplet dot may be smaller than the distance L. Since the contact angle is 90 degrees or more, $2r < L$ may be used.

Therefore, when the following Equation (5) is satisfied, the droplet dots do not contact each other.

$$L > 2 \left[ \frac{V}{\pi \left( \frac{2}{3} - \cos \theta + \frac{1}{3} \cos^3 \theta \right)} \right]^{\frac{1}{3}} \quad \text{[Equation 5]}$$

When Equation (5) is solved for V, the following Equation (6) is obtained.

$$V < \frac{L^3 \times \pi \left( \frac{2}{3} - \cos \theta + \frac{1}{3} \cos^3 \theta \right)}{8} \quad \text{[Equation 6]}$$

The processor 15 calculates the discharge amount V that satisfies Equation (6).

Here, the processor 15 calculates a discharge amount V (a first discharge amount Va) based upon the first distance La. The processor 15 calculates a discharge amount V (a second discharge amount Vb) based upon the second distance Lb.

The processor 15 has a function of discharging the liquid droplets having the discharge amount V from the nozzle 110 to the inspection paper 40.

The processor 15 conveys the liquid discharging apparatus 2 to a position where the liquid can be discharged to a first region on the inspection paper 40. Here, the processor 15 conveys the liquid discharging apparatus 2 to a position where the first nozzle 110a can discharge the liquid to the first region.

After conveying the liquid discharging apparatus 2, the processor 15 discharges the liquid at the first discharge amount Va to the inspection paper 40 from each first nozzle 110a by using the drive circuit 11. For example, the processor 15 controls a voltage applied to the first drive element 130a of the first nozzle 110a, thereby discharging the liquid at the first discharge amount Va.

The liquid discharged from the first nozzle 110a to the inspection paper 40 forms a droplet dot in the first region of the inspection paper 40. The plurality of droplet dots formed in the first region of the inspection paper 40 form a first inspection pattern.

After the liquid is discharged from the first nozzle 110a, the processor 15 conveys the liquid discharging apparatus 2 to a position where the liquid can be discharged to a second region on the inspection paper 40. Here, the processor 15 conveys the liquid discharging apparatus 2 to a position where the second nozzle 110b can discharge the liquid to the second region. The second region is a region that does not overlap the first region.

After conveying the liquid discharging apparatus 2, the processor 15 uses the drive circuit 11, thereby discharging the liquid at the second discharge amount Vb from each second nozzle 110b to the inspection paper 40. For example, the processor 15 controls a voltage applied to the second drive element 130b of the second nozzle 110b, thereby discharging the liquid at the second discharge amount Vb.

The liquid discharged from the second nozzle 110b to the inspection paper 40 forms a droplet dot in the second region of the inspection paper 40. The plurality of droplet dots formed in the second region of the inspection paper 40 form a second inspection pattern.

Figure 11:
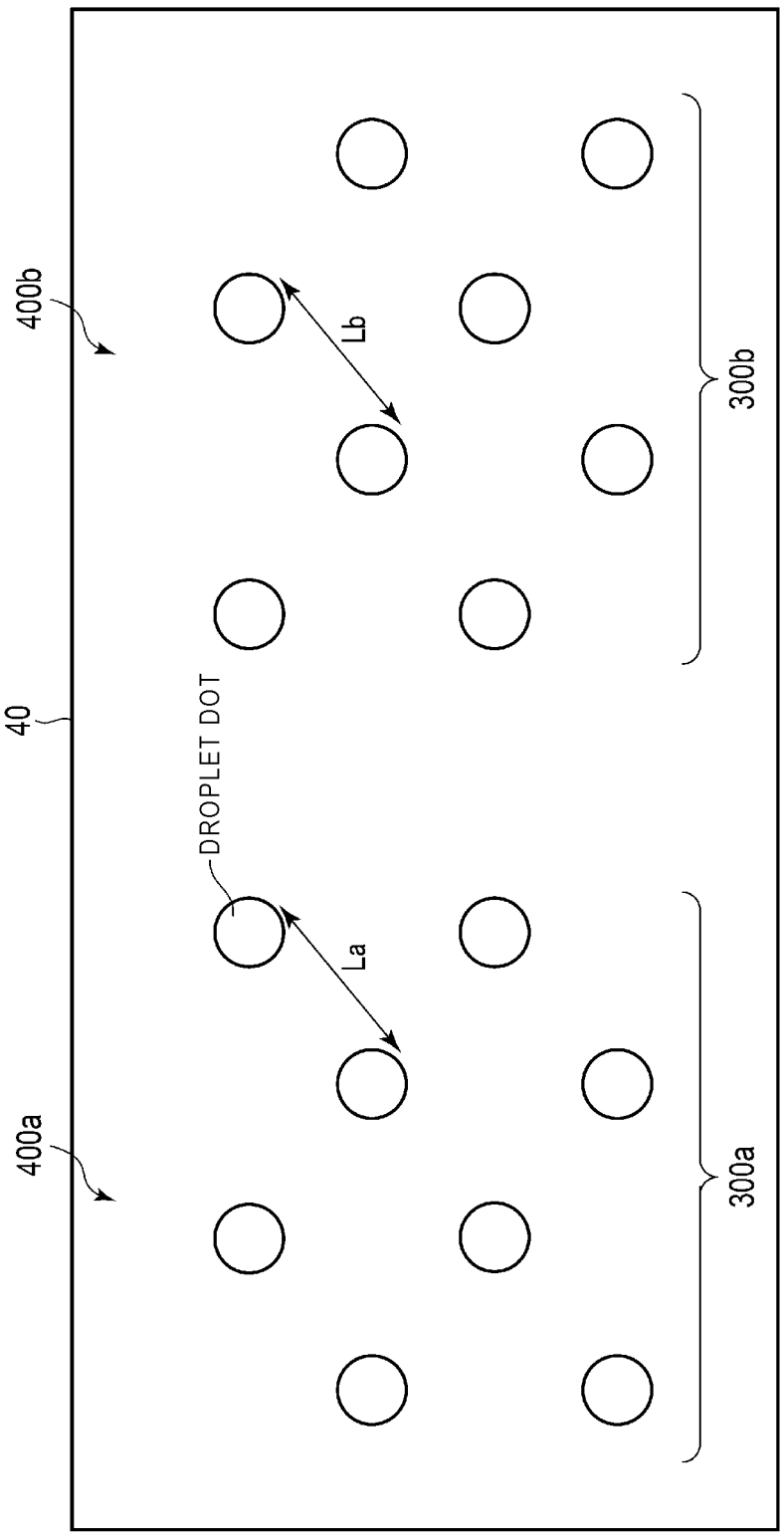
FIG. 11 is a diagram illustrating an example of an inspection paper.

FIG. 11 illustrates an example of the inspection paper 40 on which the inspection pattern is formed. As illustrated in FIG. 11, the inspection paper 40 includes a first region 300a and a second region 300b.

A first inspection pattern 400a is formed in the first region 300a. The first inspection pattern 400a is formed of droplet dots formed at the same positions as the positions of the respective first nozzles 110a. A second inspection pattern 400b is formed in the second region 300b. The second inspection pattern 400b is formed of droplet dots formed at the same positions as the positions of the respective second nozzles 110b.

The processor 15 has a function of inspecting each nozzle 110 based upon the inspection pattern formed on the inspection paper 40.

The processor 15 photographs the inspection pattern formed on the inspection paper 40 by using the image photographing unit 50. After photographing the inspection pattern, the processor 15 inspects each nozzle 110 based upon an image photographed according to a predetermined image processing algorithm. That is, the processor 15 inspects (identifies) whether or not each of the nozzles 110 is clogged (that is, identifies whether the liquid was successfully discharged therefrom).

For example, the processor 15 counts the droplet dots forming the inspection pattern according to the image processing algorithm. When the number of droplet dots is smaller than a predetermined number (for example, the number of nozzles 110), the processor 15 determines that some of the nozzles 110 are clogged.

After determining that a nozzle 110 is clogged, the processor 15 outputs an error indicating that the nozzle 110 is clogged to the host computer 18 or the like.

After determining that each of the nozzles 110 is not clogged, the processor 15 may perform the discharge operation to the well opening 300 again. The processor 15 may output information indicating that each of the nozzles 110 is not clogged to the host computer 18 or the like.

Next, an operation example of the liquid dispensing apparatus 1 will be described.

Figure 12:
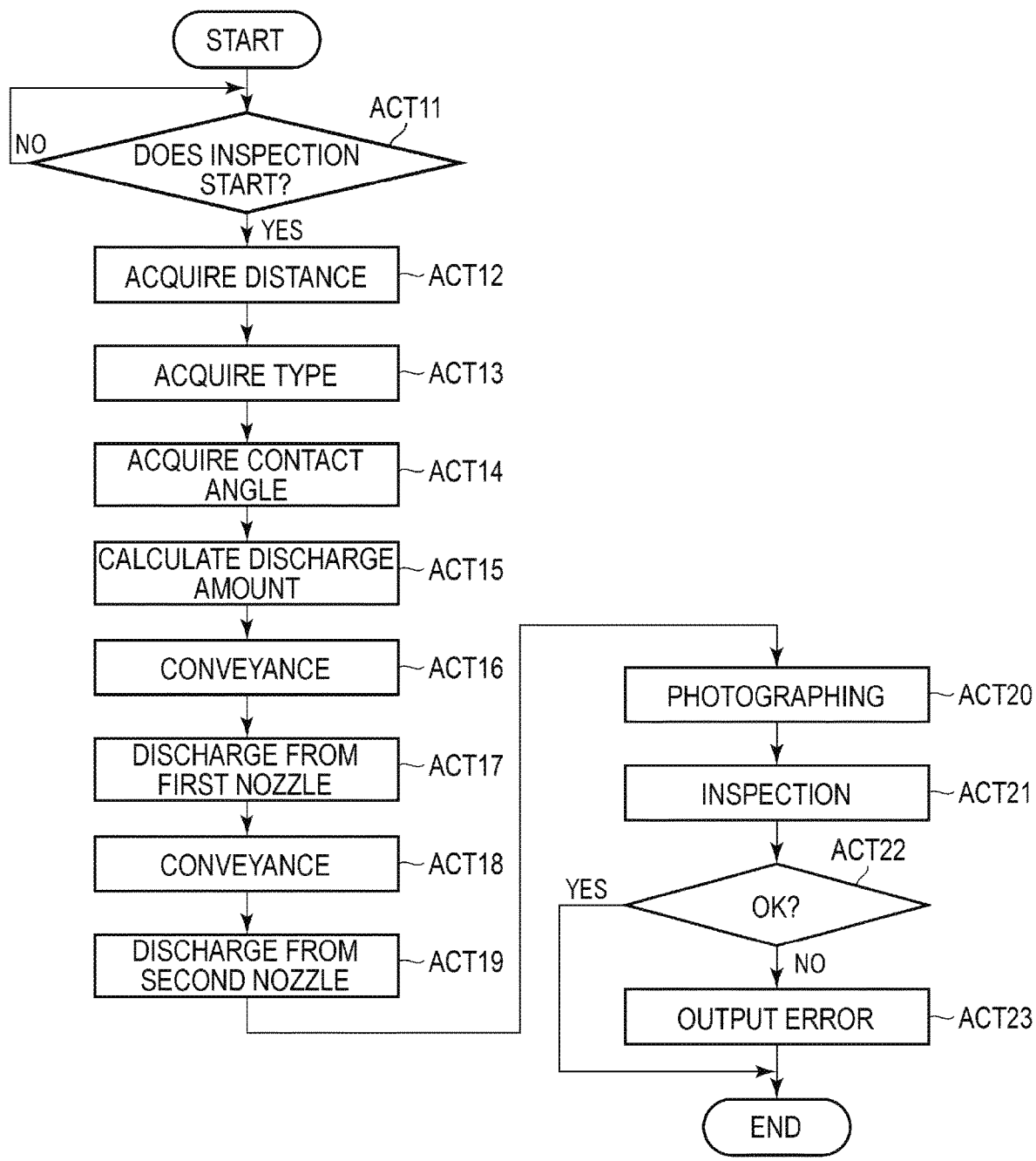
FIG. 12 is a flowchart illustrating an operation example of a liquid dispensing apparatus.

FIG. 12 is a flowchart illustrating an operation example of the liquid dispensing apparatus 1.

Here, it is assumed that the liquid discharging apparatus 2 is set in the liquid dispensing apparatus 1, and the liquid storing container 22 is filled with a liquid (e.g., a chemical solution or a liquid chemical).

First, the processor 15 of the liquid dispensing apparatus 1 determines whether to inspect the nozzle 110 (ACT 11). When determining that the inspection of the nozzle 110 is not to be performed (ACT 11, NO), the processor 15 returns to ACT 11.

When determining that the inspection of the nozzle 110 is to be performed (ACT 11, YES), the processor 15 acquires the distance L (the first distance La and the second distance Lb) between the adjacent nozzles 110 that simultaneously discharge the liquid (ACT 12).

After acquiring the distance L, the processor 15 acquires the type of the liquid being discharged from the liquid discharging apparatus 2 (ACT 13). When acquiring the type of the liquid, the processor 15 also acquires the contact angle based upon the type thereof or the like (ACT 14).

After acquiring the contact angle, the processor 15 calculates the discharge amount V (the first discharge amount Va and the second discharge amount Vb) based upon the contact angle, the distance L, and the like (ACT 15). After (or while) calculating the discharge amount V, the processor 15 conveys the liquid discharging apparatus 2 to a position where the first nozzle 110a can discharge the liquid to the first region 300a of the inspection paper 40 (ACT 16).

After conveying the liquid discharging apparatus 2, the processor 15 discharges the liquid at the first discharge amount Va from the first nozzle 110a to the inspection paper 40 (ACT 17). After discharging the liquid at the first discharge amount Va from the first nozzle 110a to the inspection paper 40, the processor 15 conveys the liquid discharging apparatus 2 to a position where the second nozzle 110b can discharge the liquid to the second region 300b of the inspection paper 40 (ACT 18).

After conveying the liquid discharging apparatus 2, the processor 15 discharges the liquid at the second discharge amount Vb from the second nozzle 110b to the inspection paper 40 (ACT 19). After discharging the liquid at the second discharge amount Vb from the second nozzle 110b to the inspection paper 40, the processor 15 photographs the droplet dots formed on the inspection paper 40 by using the image photographing unit 50 (ACT 20).

After photographing (or otherwise imaging) the droplet dots formed on the inspection paper 40, the processor 15 determines whether or not each nozzle 110 is clogged based upon the photographed image (ACT 21). When determining that a nozzle 110 is clogged (ACT 22), the processor 15 outputs an error indicating that a nozzle 110 is clogged (ACT 23).

After determining that no nozzle 110 is clogged (ACT 22, YES), or after outputting the error indicating that the nozzle 110 is clogged (ACT 23), the processor 15 terminates the operation.

The processor 15 may execute ACT 12, ACT 13, ACT 14, and ACT 15 before ACT 11.

The processor 15 may simultaneously discharge the liquid from the first nozzle 110a and the second nozzle 110b to the inspection paper 40. In this case, the processor 15 acquires a distance between the first nozzle 110a and the second nozzle 110b adjacent to each other as the distance L. The processor 15 discharges the discharge amount V based upon the distance L.

The nozzle 110 may be divided into three or more groups. That is, there may exist three or more groups of nozzles 110 that simultaneously discharge the liquids.

The inspection paper 40 may be placed on the mounting member 4a. In this case, the user replaces the microplate 4 with the inspection paper 40 before the inspection of the nozzle 110 starts. In this case, the liquid dispensing apparatus 1 need not include the inspection paper placing base 41 as a separate aspect. That is, the mounting member 4a can not only be the place for the microplate 4, but also serve as a place on which the inspection paper 40 can be placed.

The liquid dispensing apparatus 1 configured as described above discharges a liquid having a particular discharge amount at which the droplet dots formed on the inspection paper do not contact each other set according to the contact angle for the type of the liquid, the distance between the nozzles, and the like. As a result, the liquid dispensing apparatus 1 can form a distinct droplet dot for individual nozzle on the inspection paper. Therefore, based upon the inspection paper, the liquid dispensing apparatus 1 can appropriately determine whether the liquid is being discharged from each nozzle.

Second Embodiment

A discharge system 600 according to a second embodiment will be described with reference to FIGS. 13 to 15.

The discharge system 600 according to the second embodiment is different from the discharge system 500 according to the first embodiment in that the microplate 4 and the inspection paper placing base 41 move in a liquid dispensing apparatus 71. In FIGS. 13 to 15, the same components as those in FIGS. 1 to 8 will be denoted by the same reference signs, and description thereof will be omitted.

Figure 13:
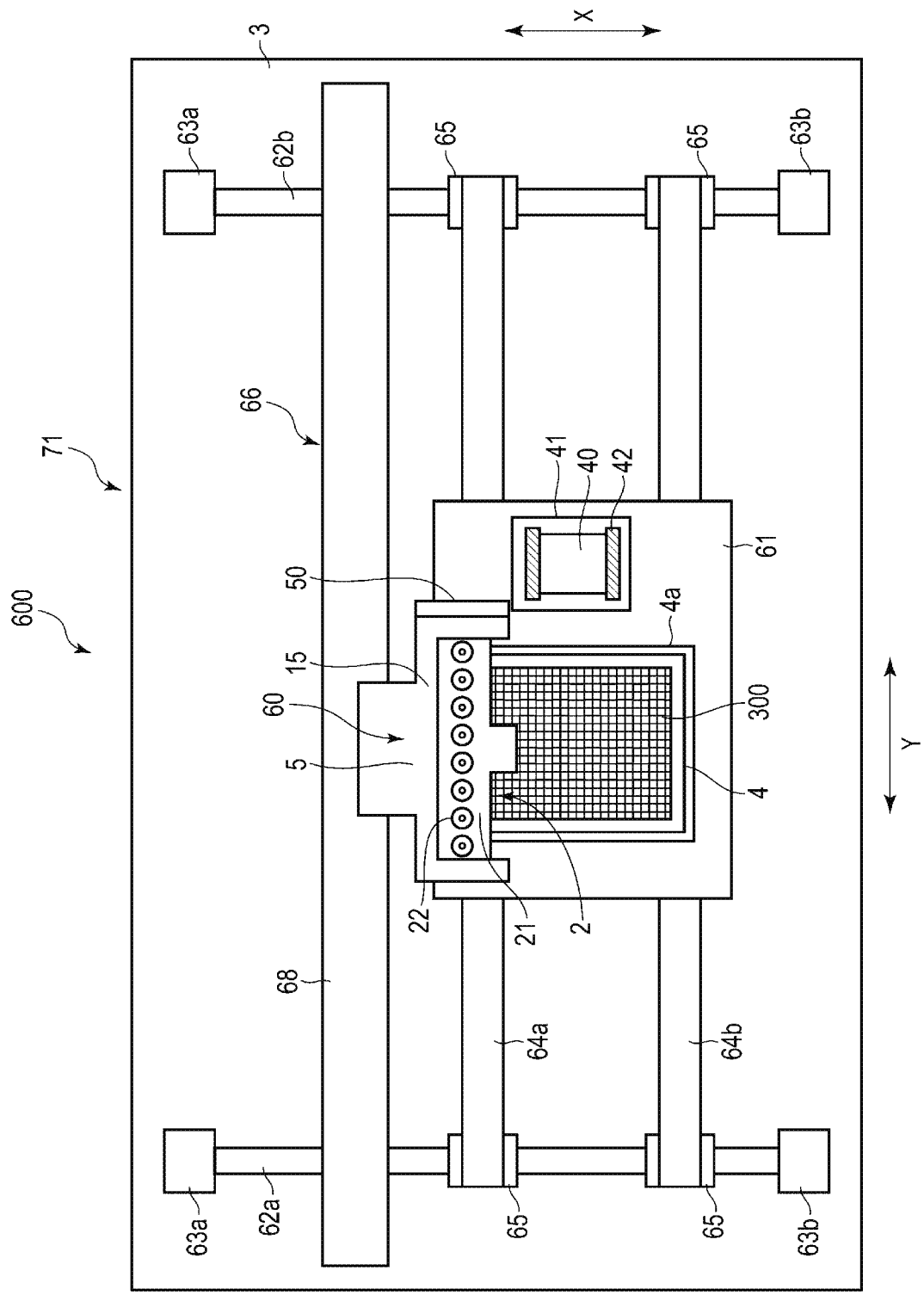
FIG. 13 is a plan view illustrating a schematic configuration of a discharge system according to a second embodiment.
Figure 14:
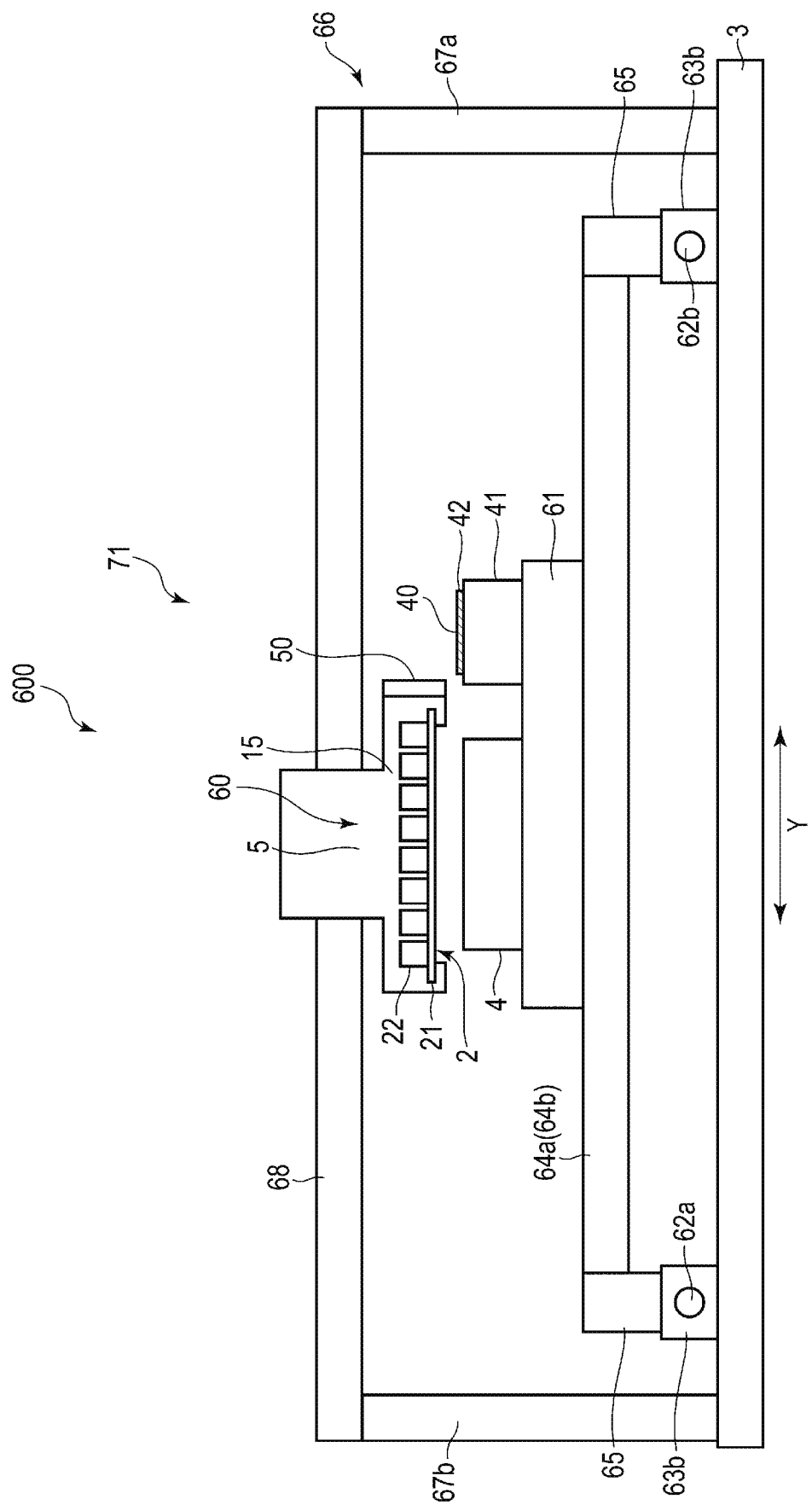
FIG. 14 is a front view illustrating a schematic configuration of a discharge system.

FIG. 13 is a plan view illustrating a schematic configuration of the discharge system 600. FIG. 14 is a front view of the discharge system 600. FIG. 15 is a block diagram illustrating a configuration example of a control system of the discharge system 600.

In the example embodiment, the microplate 4 and the inspection paper placing base 41 are fixed to a flat-shaped Y-direction moving stage 61. The Y-direction moving stage 61 is provided with the frame-shaped mounting member 4a on which the microplate 4 is detachably mounted.

On the base 3, a pair of left and right X-direction guide rails 62a and 62b extending in the X direction are provided on opposite sides. Opposite ends (upper and lower ends in FIG. 13) of the respective X-direction guide rails 62a and 62b are fixed to fixing bases 63a and 63b protruding on the base 3.

Two Y-direction guide rails 64a and 64b extending in the Y direction are provided between the X-direction guide rails 62a and 62b. The two Y-direction guide rails 64a and 64b are disposed in parallel in the X direction with a gap. Opposite ends of the two Y-direction guide rails 64a and 64b are fixed to an X-direction moving base 65 that can slide in the X direction along the X-direction guide rails 62a and 62b. The four X-direction moving bases 65 slide simultaneously.

The Y-direction moving stage 61 is fixed to the two Y-direction guide rails 64a and 64b. Accordingly, an operation in which the Y-direction moving stage 61 moves in the Y direction along the two Y-direction guide rails 64a and 64b and an operation in which the X-direction moving base 65 moves in the X direction along the X-direction guide rails 62a and 62b can be combined with each other, whereby the microplate 4 and the inspection paper placing base 41 are movably supported to be at any positions in the orthogonal XY direction.

A fixing mechanism unit 66 for fixing the mounting module 5 at a position not interfering with a moving range of the Y-direction moving stage 61 is provided on the base 3. As illustrated in FIG. 14, the fixing mechanism unit 66 includes two columns 67a and 67b and one horizontal frame 68 extending in the Y direction. The two columns 67a and 67b are provided upright in a vertical direction at opposite ends in the Y direction of the base 3. The horizontal frame 68 is provided between the upper ends of the two columns 67a and 67b. The mounting module 5 is fixed at approximately a center position of the horizontal frame 68. The liquid discharging apparatus 2 is fixed to the mounting module 5. In the mounting module 5, the image photographing unit 50 is mounted on a part of the mounting module 5 which is a mounting unit of the liquid discharging apparatus 2.

Figure 15:
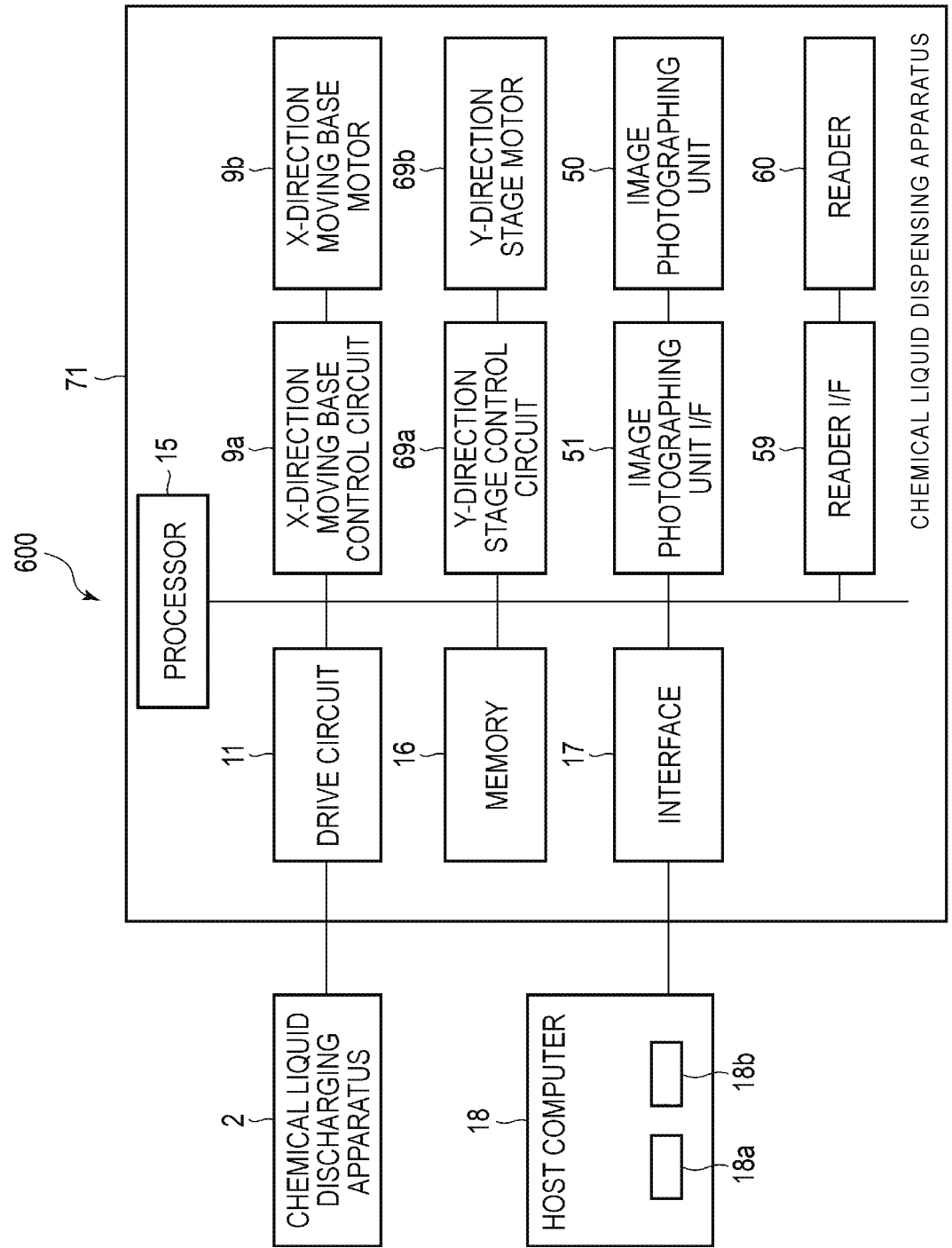
FIG. 15 is a block diagram illustrating a control system of a discharge system.

As illustrated in FIG. 15, the liquid dispensing apparatus includes a Y-direction stage control circuit 69a and a Y-direction stage motor 69b instead of the Y-direction moving base control circuit 10a and the Y-direction moving base motor 10b. The processor 15 and the Y-direction stage control circuit 69a are connected to each other via a data bus. The Y-direction stage control circuit 69a is connected to the Y-direction stage motor 69b.

The Y-direction stage control circuit 69a drives the Y-direction stage motor 69b based upon a signal from the processor 15. The Y-direction stage control circuit 69a supplies the signal or power to the Y-direction stage motor 69b, thereby driving the Y-direction stage motor 69b.

The Y-direction stage motor 69b moves the Y-direction moving stage 61 in the Y direction. For example, the Y-direction stage motor 69b is connected to the Y-direction moving stage 61 via a gear or the like, and moves the Y-direction moving stage 61 in the Y direction.

In the second embodiment, the X-direction moving base motor 9b moves the X-direction moving base 65 in the X direction. For example, the X-direction moving base motor 9b is connected to the X-direction moving base 9 via a gear or the like, and moves the X-direction moving base 65 in the X direction.

Since a function and an operation example of the liquid dispensing apparatus 71 are the same as those of the liquid dispensing apparatus 1 according to the first embodiment, and the additional description thereof will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid dispensing apparatus, comprising:
   a mounting unit configured to hold a liquid discharging apparatus that discharges liquid from a first group of nozzles simultaneously and a second group of nozzles simultaneously by an operation of an actuator;
   an inspection media placement region on which an inspection medium can be placed to receive the liquid discharged from the liquid discharging apparatus held by the mounting unit; and
   a controller configured to control the operation of the actuator to vary a volume of the liquid discharged from each nozzle for a nozzle inspection operation according to a predetermined distance between adjacent nozzles of the liquid discharging apparatus that simultaneously discharge the liquid and a predetermined contact angle of a droplet of the liquid on the inspection medium, wherein
   the nozzle inspection operation includes discharging the liquid simultaneously from the first group of nozzles at a first volume at a first location in the inspection media placement region and then discharging the liquid simultaneously from the second group of nozzles at a second volume at a second location in the inspection media placement region.

2. The liquid dispensing apparatus according to claim 1, further comprising:
   an interface configured to acquire a type of the liquid being discharged in the nozzle inspection operation, wherein
   the controller is configured to acquire the predetermined contact angle based upon the acquired type of the liquid.

3. The liquid dispensing apparatus according to claim 2, wherein the interface is connected to an external device storing the type of the liquid in association with the predetermined contact angle of the droplet of the liquid.

4. The liquid dispensing apparatus according to claim 1, further comprising:
   a reader configured to read an identifier from the liquid discharging apparatus, wherein
   the controller is configured to acquire the predetermined distance based upon the identifier read from the liquid discharging apparatus.

5. The liquid dispensing apparatus according to claim 4, wherein the reader is positioned to read the identifier from the liquid discharging apparatus while the liquid discharging apparatus is being held by the mounting unit.

6. The liquid dispensing apparatus according to claim 1, further comprising:
a microplate holder configured to hold a microplate at a position to receive liquid from the liquid discharging apparatus held by the mounting unit.

7. The liquid dispensing apparatus according to claim 6, wherein the inspection media placement region is adjacent to the microplate holder.

8. The liquid dispensing apparatus according to claim 6, wherein the inspection media placement region overlaps with a region in which the microplate is positioned when held by the microplate holder.

9. The liquid dispensing apparatus according to claim 1, further comprising:
an inspection camera positioned to photograph an inspection pattern formed on the inspection medium by droplets discharged by the liquid discharging apparatus, wherein
the controller is configured to control the inspection camera to photograph the inspection pattern and then determine whether liquid is being discharged from each of the nozzles based on image analysis of the photograph of the inspection pattern.

10. The liquid dispensing apparatus according to claim 1, further comprising:
a moveable XY stage including a microplate holding region and the inspection media placement region thereon, wherein
the controller is configured to control the moveable XY stage to position the inspection media placement region below the liquid discharging apparatus during the nozzle inspection operation.

11. The liquid dispensing apparatus according to claim 1, wherein
the mounting unit is moveable in an XY plane, and
the controller is configured to cause the mounting unit to position the liquid discharging apparatus above the inspection media placement region during the nozzle inspection operation.

12. A liquid dispensing apparatus, comprising:
a discharge head mount configured to hold a liquid discharge head having a plurality of nozzles for discharging droplets of liquid;
an inspection media placement region on which an inspection medium can be placed to receive the droplets from the liquid discharge head held by the discharge head mount;
a drive circuit electrically connected to the liquid discharge head and configured to drive a plurality of actuators corresponding to the plurality of nozzles to discharge the droplets from the plurality of nozzles; and
a controller connected to the drive circuit and configured to control the drive circuit to vary a volume of the droplets discharged from each nozzle in the plurality of nozzles for a nozzle inspection operation, the volume of the droplets being set according to a predetermined distance between adjacent nozzles of the liquid discharge head that simultaneously discharge the droplets and a predetermined contact angle of a droplet of the liquid on the inspection medium, wherein
the nozzle inspection operation includes discharging the liquid simultaneously from a first group of nozzles in the plurality of nozzles at a first volume at a first location in the inspection media placement region and then discharging the liquid simultaneously from a second group of nozzles in the plurality of nozzles at a second volume at a second location in the inspection media placement region.

13. The liquid dispensing apparatus according to claim 12, wherein the controller is configured to acquire information indicating a type of liquid and then acquire the predetermined contact angle from an external device according to the type of the liquid.

14. The liquid dispensing apparatus according to claim 12, further comprising:
an optical reader positioned to read an identifier on the liquid discharging head, wherein
the controller is configured to acquire the predetermined distance based upon the identifier read from the liquid discharging head.

15. The liquid dispensing apparatus according to claim 12, further comprising:
an inspection camera positioned to photograph an inspection pattern formed on the inspection medium by the droplets discharged by the liquid discharging head, wherein
the controller is configured to control the inspection camera to photograph the inspection pattern and then determine whether liquid is being discharged from each of the plurality of nozzles based on image analysis of the photograph of the inspection pattern.

16. The liquid dispensing apparatus according to claim 12, further comprising:
a moveable XY stage including a microplate holding region and the inspection media placement region thereon, wherein
the controller is configured to control the moveable XY stage to position the inspection media placement region below the liquid discharging head during the nozzle inspection operation.

17. The liquid dispensing apparatus according to claim 12, wherein
the discharge head mount is moveable in an XY plane, and
the controller is configured to cause the discharge head mount to position the liquid discharging head above the inspection media placement region during the nozzle inspection operation.

18. The liquid dispensing apparatus according to claim 12, further comprising:
a microplate holder configured to hold a microplate at a position to receive the droplets from the liquid discharging head held by the discharge head mount.

19. A nozzle inspection method for a liquid dispensing apparatus, the method comprising:
positioning a liquid discharging head that can discharge liquid from a plurality of nozzles simultaneously above a first location in an inspection media placement region, the liquid discharging head being held by a mounting unit;
acquiring a distance between a first group of adjacent nozzles of the liquid discharging head that simultaneously discharge liquid, the distance being acquired based on an identifier code on the liquid discharging head;
acquiring a contact angle of a droplet on an inspection medium, the contact angle being acquired based on a type of liquid to be discharged from the liquid discharging head;
setting a volume of droplets to be dispensed from the liquid discharging head by the first group of adjacent nozzles based on the acquired distance and the acquired contact angle, the volume being set such that droplets from the first group of adjacent nozzles will not overlap on the inspection medium after discharge from the liquid discharging heat;

discharging droplets of the liquid at the first location simultaneously from the first group of nozzles at the set volume;

positioning the liquid discharging head above a second location in the inspection media placement region; and discharging droplets of the liquid at the second location simultaneously from a second group of nozzles in the plurality of nozzles at the set volume.

20. The nozzle inspection method according to claim 19, further comprising:

acquiring an image of an inspection pattern formed by the droplets on the inspection medium; and performing image analysis on the acquired image to detect whether any nozzle in the plurality of nozzles is blocked or otherwise inoperable.

* * * * *

UNITED STATES PATENT AND TRADEMARK OFFICE
CERTIFICATE OF CORRECTION

PATENT NO. : 11,247,467 B2
APPLICATION NO. : 16/927793
DATED : February 15, 2022
INVENTOR(S) : Shuhei Yokoyama and Ryutaro Kusunoki It is certified that error appears in the above-identified patent and that said Letters Patent is hereby corrected as shown below:

In the Claims

In Column 21, Claim 19, Line 4, please replace "heat" with "head".

Signed and Sealed this
Fifteenth Day of November, 2022

Katherine Kelly Vidal
*Director of the United States Patent and Trademark Office*